March 9, 1937.　　　P. J. BROWNSON　　　2,073,511
NOSE GUARD
Filed March 23, 1936

INVENTOR.
Percy J. Brownson
BY H. S. Johnson
ATTORNEYS.

Patented Mar. 9, 1937

2,073,511

UNITED STATES PATENT OFFICE 2,073,511

NOSE GUARD

Percy J. Brownson, Hastings, Minn.

Application March 23, 1936, Serial No. 70,192

3 Claims. (Cl. 54—80)

My invention relates to improvements in nose guards for animals, as horses and mules, designed particularly for protecting an animal's muzzle from flies.

An object of the present invention is to provide a guard that will be adjustable to different widths and lengths of an animal's muzzle and which in use will automatically adjust itself to cause the retaining straps to lie flat against the face of the animal.

Figure 1:
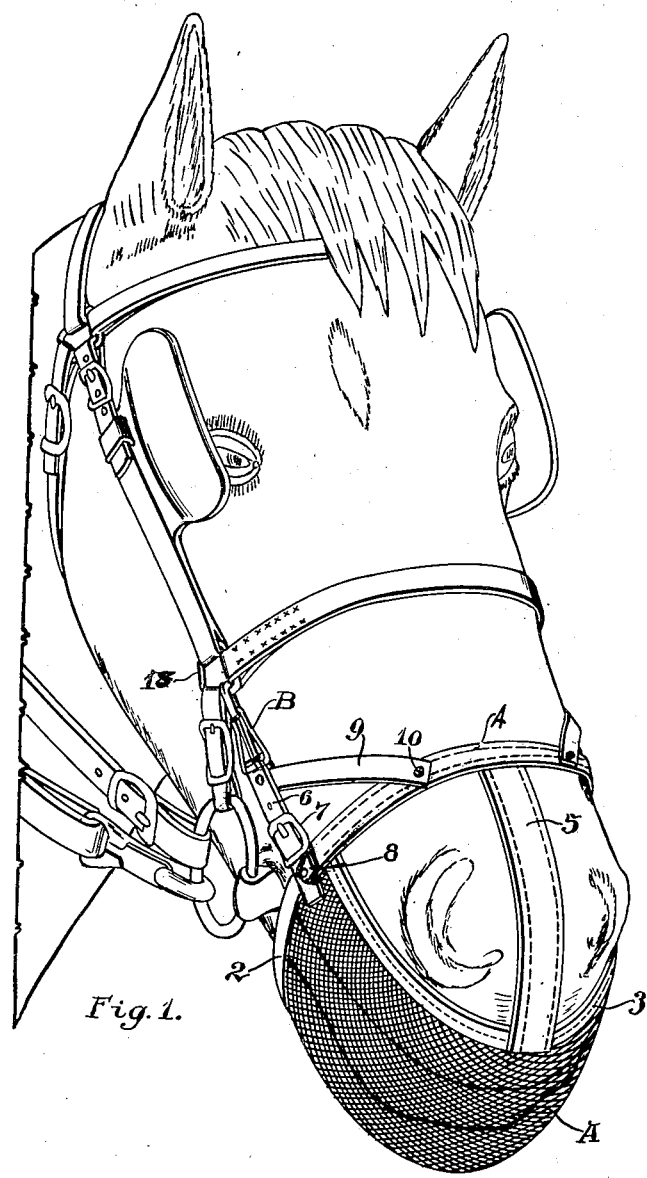
Figure 2:
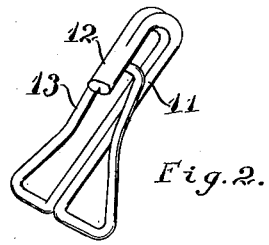
Figure 3:
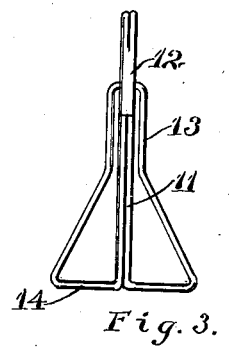

This and other features of the invention will be more specifically set forth in the following description and the accompanying drawing, wherein:

Figure 1 is a perspective view of the invention shown in use positioned upon the bridle; and Figures 2 and 3 are views in detail of a snap forming part of the invention.

Referring to the drawing in detail, A represents the body of the guard formed of open-work mesh and shaped to enclose the lower lip of the muzzle of the animal. The body portion of the guard, as shown, is of substantially quarter-spherical shape, being approximately a quarter of a complete sphere, whereby there is constituted a rear opening into which the muzzle of the animal projects and an open top exposing the upper nostril portion of the animal's face, except where the upper portion of the animal's face is covered by the straps, hereinafter specifically described, forming a part of the guard.

The body portion A at its rear edge is protected by a rim of suitable material, as leather or fabric, 2, and a similar rim encloses the upper edge 3. A strap 4 connects the corner edges of the rims 2 and 3 and in use extends over the animal's face, as shown in Figure 1, the strap 4 being centrally connected by a strap 5 to the center of the rim portion 3 of the guard.

A pair of straps 6 are adjustably connected, as by buckles 7, with strap portion 8 fastened near the upper ends of the rim 2.

A pair of straps 9 have suitable swivel connection 10 to the strap 4 on opposite sides of the center of said strap, the opposite ends of said straps 9 being connected with the free ends of the strap 6. Each of the straps 6 at their free ends supports a snap B. This snap is of special design particularly adapted to cooperate with the novel construction of nose guard.

As shown in Figures 2, 3, and 4 the snap is formed of a single piece of wire bent to form a flat back portion 11, the wires terminating at their free ends in a hook 12, and at the end opposite the hook being bent outwardly and inwardly over the back portion to form a tongue 13 projecting under the hook. The outward bending of the wires to form the base of the tongue produces the loops 14 to bring about strength and desirable spring resiliency of the tongue. The ends of the wire forming the hook 12 are preferably joined together, as by spot welding.

The bottom of the open work mesh body A, toward the front, projects downwardly below the rear rim 2 so as to leave a space between the under side of the lower jaw of the animal and the guard when the same is in position, as shown in Figure 1. The mesh body is thus held out of contact with the lower jaw of the animal and a space is provided permitting an air flow underneath the animal's jaw. This is of particular importance in providing for the comfort of the animal.

In use, the nose guard is placed over the animal's muzzle, as shown in Figure 1, and supported in position upon the bridle as by snapping the snaps B into locking engagement with the loops 15 forming a part of the bridle. The rim 3, in use, will cover, as shown, the upper lip of the animal.

In adjusting the present invention to the particular width and length of the animal's muzzle, the strap 6 is adjusted to conform with the length, and the strap 9 will swing upon the swivel connection 10 in conforming to the width and length of the animal's muzzle, resulting in the strap 9 lying flat against the animal's cheeks in every adjusted position. This prevents any twisting of the supporting straps 6 and 9 in the differently adjusted positions of the guard, removing the objection that exists with standard guards in irritating the animal through the twisting of non-adjustable strap supports.

The form of snap particularly co-operates in helping to hold the supporting straps flat. The loops 14 of the snap are anchored so as to be held flat in the looped ends of the strap 6, as shown in Figure 4, the sides of the loops 14 of the snap extending outwardly from the sides of the loops on the ends of the strap and the base wires 11 extending outwardly through a central opening in the loop. There is thus an anchorage holding the snaps flat with the end of the loop.

With so many animals, particularly horses, of a nervous temperament, it is very desirable, in connection with a nose guard, to guard in every way against irritation, and in the particular arrangement and construction of the supporting means for the guard above set forth, being adjustable as they are to the different lengths and widths of muzzles, and through the swivel connection 10 for the supporting straps 9 holding said straps at all times flat against the animal's cheeks, brings about the extreme of comfortable fit and reduces the irritating contacts to a minimum.

I claim:

1. An animal nose guard of the class described, comprising an open-work body portion of substantially quarter-spherical shape, a surrounding rim, a cross strap connecting the corners of said body portion, a central strap connecting said cross strap with the front portion of said body portion, adjustable supporting straps connected to the body portion near its corners, and tie straps connected at one end of the outer ends of the adjustable straps and having swivel connection at their inner ends to said cross strap.

2. An animal nose guard of the class described, comprising an open-work body portion of substantially quarter-spherical shape, a surrounding rim, a cross strap connecting the corners of the body portion, a central strap connecting said cross strap with the front portion of said body portion, adjustable supporting straps connected to the body portion near its corners, tie straps connected at one end of the outer ends of the adjustable straps and having swivel connection at their inner ends to said cross strap, said open-work body projecting downwardly on its under side affording a space between the under jaw of the animal and said open work body when the guard is in supported position upon the muzzle of the animal.

3. An animal nose guard of the class described, comprising an open-work body portion of substantially quarter-spherical shape, a surrounding rim, a cross strap connecting the corners of the body portion, a central strap connecting said cross strap with the front portion of the body portion, adjustable supporting straps connected to the body portion near its corners, tie straps connected at one end of the outer ends of the adjustable straps and having swivel connection at their inner ends to said cross strap, a snap carried by the outer ends of said supporting straps, said snap being formed of one piece of wire bent to form a pair of loops anchored flatwise in the ends of said straps, said loops terminating in a tongue above said strap, and a base portion extending outwardly through a central opening in said strap and terminating in a curved portion projecting upwardly and inwardly over the end of the tongue.

PERCY J. BROWNSON.